United States Patent [19]
Kojima

[11] Patent Number: 5,370,375
[45] Date of Patent: Dec. 6, 1994

[54] VIBRATION ISOLATOR

[75] Inventor: Hiroshi Kojima, Yokohama, Japan

[73] Assignee: Bridgestone Corporation, Tokyo, Japan

[21] Appl. No.: 991,386

[22] Filed: Dec. 16, 1992

[30] Foreign Application Priority Data

Dec. 20, 1991 [JP] Japan .................. 3-338891
Mar. 25, 1992 [JP] Japan .................. 4-067117

[51] Int. Cl.⁵ .......................... F16F 13/00; F16F 9/00
[52] U.S. Cl. .................. 267/140.14; 267/219; 248/562; 248/636
[58] Field of Search ............... 267/140.13, 140.14, 267/140.15, 219; 188/299; 180/291, 300, 312, 902; 248/562, 636

[56] References Cited

U.S. PATENT DOCUMENTS

| | | | |
|---|---|---|---|
| 4,709,779 | 12/1987 | Takehara | 267/140.15 X |
| 4,768,759 | 9/1988 | Bellamy et al. | 188/299 X |
| 4,867,263 | 9/1989 | Sugino et al. | 267/140.13 X |
| 4,886,252 | 12/1989 | Häussermann | 267/140.13 |
| 5,215,293 | 6/1993 | Muramatsu et al. | 267/140.14 |

FOREIGN PATENT DOCUMENTS

| | | | |
|---|---|---|---|
| 9151637 | 8/1984 | Japan | 267/140.14 |
| 61-248934 | 11/1986 | Japan | . |
| 62-127537 | 6/1987 | Japan | . |
| 1135939 | 5/1989 | Japan | 267/140.13 |

Primary Examiner—Andres Kashnikow
Assistant Examiner—Kevin D. Rutherford
Attorney, Agent, or Firm—Oliff & Berridge

[57] ABSTRACT

A vibration isolator includes: a housing which is filled with a fluid; an intermediate plate inserted in the housing for partitioning the interior of the housing into two liquid chambers, the intermediate plate having therein a cylinder and at least two passageways for allowing the two liquid chambers to communicate with each other, the cylinder being formed at a position midway in one of the passageways, and one of the liquid chambers being provided with an elastic wall to render the capacity of that liquid chamber variable; a piston capable of opening and closing one of the passageways as the piston moves in the cylinder; and a pressure changeover valve disposed outside the housing and capable of moving the piston by means of a change in pressure by applying a gas pressure to the piston.

16 Claims, 7 Drawing Sheets

FIG. 6
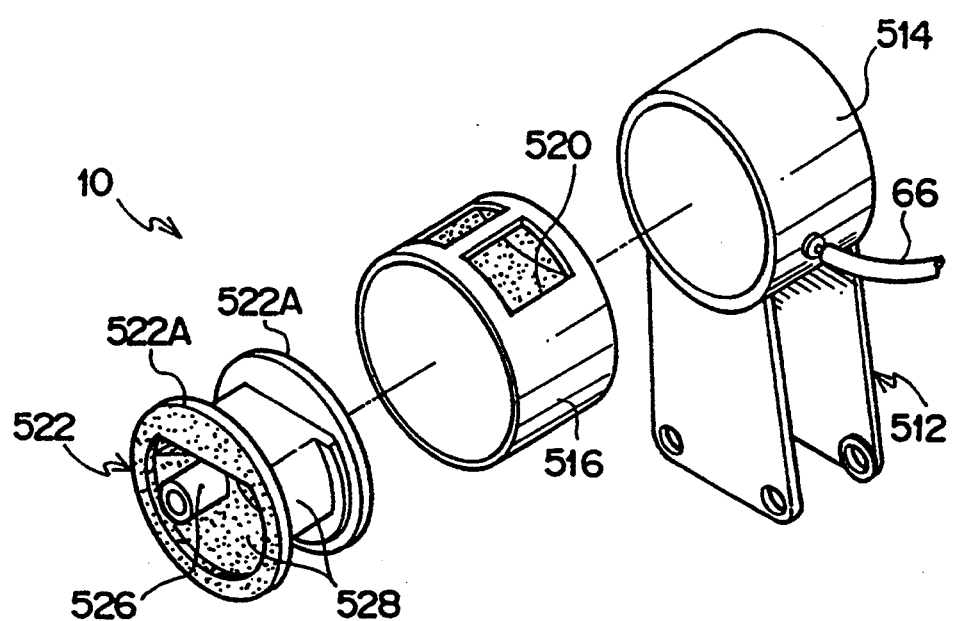
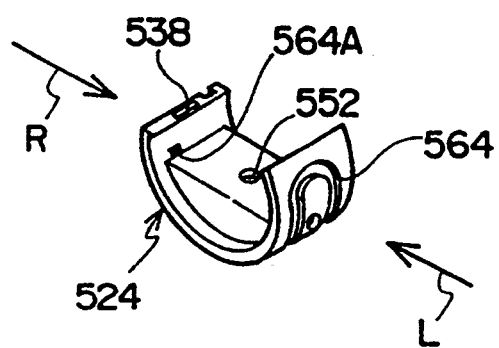

VIBRATION ISOLATOR

BACKGROUND OF THE INVENTION

1. Field of the Invention

The present invention relates to a vibration isolator for use in a vehicle, a general industrial machine or the like and adapted to absorb and attenuate vibrations from a vibration-generating portion thereof.

2. Description of the Related Art

In an automobile engine, a vibration isolator serving as an engine mount is interposed between the engine and the chassis, so as to prevent the vibrations of the engine from being imparted to the chassis. Vibrations of the engine include low-frequency vibrations such as shaking vibrations, as well as high-frequency vibrations such as idling vibrations, and vibration isolators of a liquid-sealed type have been proposed to absorb and attenuate the vibrations of both high and low frequencies.

The vibration isolator of the liquid-sealed type is provided with a pressure-receiving liquid chamber (a main liquid chamber) and an auxiliary liquid chamber, which are filled with a liquid and communicate with each other through two passageways. The sizes (cross-sectional areas and lengths) of these passageways are set for absorbing the shaking vibrations and the idling vibrations, respectively.

A valve is connected to the passageway for high frequencies, and this valve is closed during the occurrence of low-frequency vibrations so that the liquid does not flow through the passageway for high frequencies. Consequently, during the occurrence of the low-frequency vibrations, the liquid flows only through the passageway for low frequencies, thereby making it possible to effectively absorb the low-frequency vibrations.

An actuator such as a motor is used for opening and closing the valve for opening and closing the passageway. However, in order to open and close the valve, it is necessary to precisely control the rotating direction of a motor shaft and the rotational speed or rotational angle thereof. As a result, a control circuit becomes complicated, and a sensor or the like for detecting the opening and closing of the valve is required. In addition, to ensure the efficiency in assembling the vibration isolator and the reliability of an electric system, the actuator such as the motor is mounted on an outer surface of a body of the vibration isolator. Consequently, the size of the body of the vibration isolator becomes large, and there are sometimes restrictions in the space where the vibration isolator is installed. In addition, the control circuit is complicated, and the cost of the motor itself is high, so that there is a problem in that the cost of the vibration isolator as a whole becomes high.

In addition, although a method has been proposed for opening and closing the valve by mounting as an actuator a cylinder means on the outer side of the body of the vibration isolator instead of the motor, the size of the body of the vibration isolator becomes unavoidably large as in the case where the motor is used.

SUMMARY OF THE INVENTION

Accordingly, it is an object of the present invention to provide a compact vibration isolator of a liquid-sealed type in which the overall structure including a controller is simplified.

The vibration isolator in accordance with the present invention for absorbing and attenuating vibrations from a vibration-generating portion, comprises: a housing which is filled with a fluid; an intermediate plate (a partition member) inserted in the housing for partitioning an interior of the housing into two liquid chambers, the intermediate plate having therein a cylinder (an inner chamber) and at least two passageways for allowing the two liquid chambers to communicate with each other, the cylinder being formed at a position midway in one of the passageways, and at least one of the two liquid chambers being provided with an elastic wall to render a capacity of the at least one of the two liquid chambers variable; a piston capable of opening and closing one of the passageways as the piston moves in the cylinder; and variable-pressure supplying means capable of moving the piston by means of a change in pressure by applying a gas pressure to the piston.

Preferably, a first opening for allowing the cylinder and one of the liquid chambers to communicate with each other is formed in the intermediate plate, the piston is hollow, one of axial bottom planes of the piston has an opening and the other one of the bottom planes thereof is closed, the opening in the piston communicates with the other one of the liquid chambers, the piston has in its side surface a second opening for allowing an interior of the piston and the cylinder to communicate with each other, and the second opening is capable of overlapping with the first opening when the piston is at a predetermined position, thereby making it possible to open one of the passageways.

Preferably, the variable-pressure supplying means is a three-port two-position changeover valve disposed outside the housing, one port of the three-port two-position changeover valve being connected to an air chamber, formed in the cylinder by a portion of a cylinder wall surface and the closed bottom plane of the piston, and remaining ports of the three-port two-position changeover valve being adapted to be selectively made to communicate with the atmosphere and negative-pressure Generating means or positive-pressure generating means. In the present invention, since the operation of opening and closing the passageway for allowing the liquid chambers to communicate with each other is effected by making use of a change in air pressure instead of a motor, the structure of the main body of the vibration isolator can be made simple and compact. If the vibration-generating portion is an automobile engine, and a vibration-receiving portion is an automobile chassis, the negative-pressure generating means can make use of an intake manifold of the engine.

The vibration isolator in accordance with the present invention may be further provided with means for determining vibration frequencies imparted to the vibration isolator; and control means for controlling the variable-pressure supplying means to move the piston such that the first opening and the second opening overlap with each other when the vibrations are high-frequency vibrations, and such that the first opening and the second opening do not overlap with each other when the vibrations are low-frequency vibrations.

In accordance with the vibration isolator of the present invention, if, fox- instance, a first mounting member is coupled to the vibration-generating portion of the engine is coupled to the vibration-generating portion of the engine or the like, and a second mounting member is coupled to the vibration-receiving portion of such as the chassis, the vibrations of the engine or the like are transmitted to the vibration-receiving portion of such as the chassis via the first mounting portion, the elastomer member, and the second mounting portion. These vibrations are absorbed by resistance based on the internal friction of the elastomer member and by the passage resistance or liquid-column resonance of the liquid occurring in the passageway between the main liquid chamber and the auxiliary liquid chamber.

If the passageways are respectively tuned in such a manner as to cope with the vibrations to be absorbed, and the passageway other than the passageway corresponding to the vibrations to be absorbed is set in a noncommunicating state by moving the hollow piston, the liquid can be made to flow only by means of the passageway corresponding to the vibrations to be absorbed. For this reason, the liquid can be effectively subjected to the passage resistance, or to the liquid-column resonance, thereby making it possible to absorb the vibrations.

In the present invention, in a case where a single main liquid chamber and a single auxiliary liquid chamber are made to communicate with each other by means of a plurality of passageways, the inner chamber may be made to communicate with one or all of these passageways. In addition, if the single main liquid chamber and a plurality auxiliary liquid chambers are made to communicate with each other by means of the passageways, the inner chamber and the hollow piston may be made to communicate with one or all of these passageways.

The above and other objects and features of the invention will more fully appear from the following detailed description when read in conjunction with the accompanying drawings. It is to be expressly understood, however, that the drawings are for purpose of illustration and are not intended as a definition of the limits of the invention.

BRIEF DESCRIPTION OF THE DRAWINGS

FIG. 6 is an exploded perspective view of vibration isolator in accordance with a third embodiment of the present invention;

DESCRIPTION OF THE PREFERRED EMBODIMENT

First embodiment

Referring to FIGS. 1 to 4, a description will be given of a first embodiment of a vibration isolator 10 in accordance with the present invention.

Figure 1:
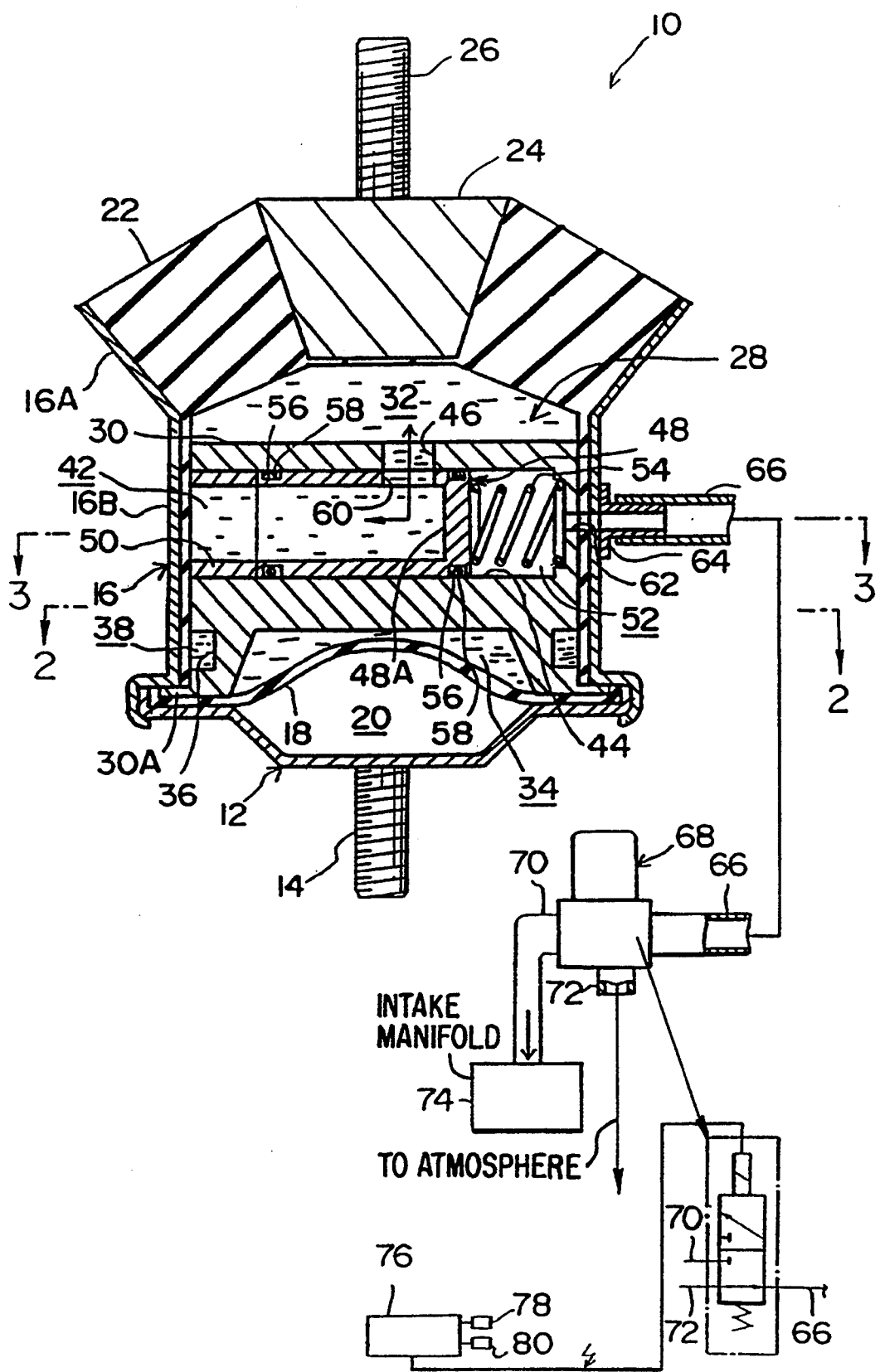
FIG. 1 is a cross-sectional view of a vibration isolator in accordance with a first embodiment of the present invention as taken along an axis thereof.

As shown in FIG. 1, the vibration isolator 10 in accordance with this embodiment has a bottom plate 12 serving as a first mount portion. A mounting bolt 14 projects downward from a center of the bottom plate 12 and is secured to, for example, a chassis of an unillustrated automobile.

A lower end of an outer cylinder 16 is secured to a peripheral portion of the bottom plate 12. A peripheral portion of a diaphragm 18 is held between the bottom plate 12 and the lower end of the outer cylinder 16. A space defined by the diaphragm 18 and the bottom plate 12 is formed as an air chamber 20, and is made to communicate with the outside, as necessary.

An upper end portion of the outer cylinder 16 is formed as a flared portion 16A whose inside diameter is gradually enlarged. An elastomer member 22 is filled in the flared portion 16A, and an outer periphery of the elastomer member 22 is vulcanized to an inner periphery of the flared portion 16A. A support base 24 serving as a second mount portion is embedded in and vulcanized to a central portion of the elastomer member 22. In addition, part of the elastomer member 22 extends to a vicinity of the lower end of the outer cylinder 16 along the inner periphery of a cylindrical portion 16B of the outer cylinder 16 and is vulcanized to the inner periphery of the cylindrical portion 16B. This support base 24 is a mounting portion for an unillustrated engine, and a mounting bolt 26 for fixing the engine is disposed uprightly on the support base 24.

A liquid chamber 28 is formed by an inner peripheral surface of the outer cylinder 16, an inner surface of the elastomer member 22, and the diaphragm 18. A liquid such as ethylene glycol is filled in this liquid chamber 28.

A cylindrical partition member 30 is disposed in the liquid chamber 28 coaxially with the mounting bolts 26 and 14, and partitions the liquid chamber 28 into a main pressure-receiving liquid chamber 32 on the support base 24 side and an auxiliary pressure-receiving liquid chamber 34 on the diaphragm 18 side. This partition member is formed of a synthetic resin or the like and has a substantially hat-like cross section. A lower peripheral portion 30A of the partition member 30 is held between the lower end of the outer cylinder 16 and the peripheral portion of the bottom plate 12 via the peripheral portion of the diaphragm 18.

Figure 2:
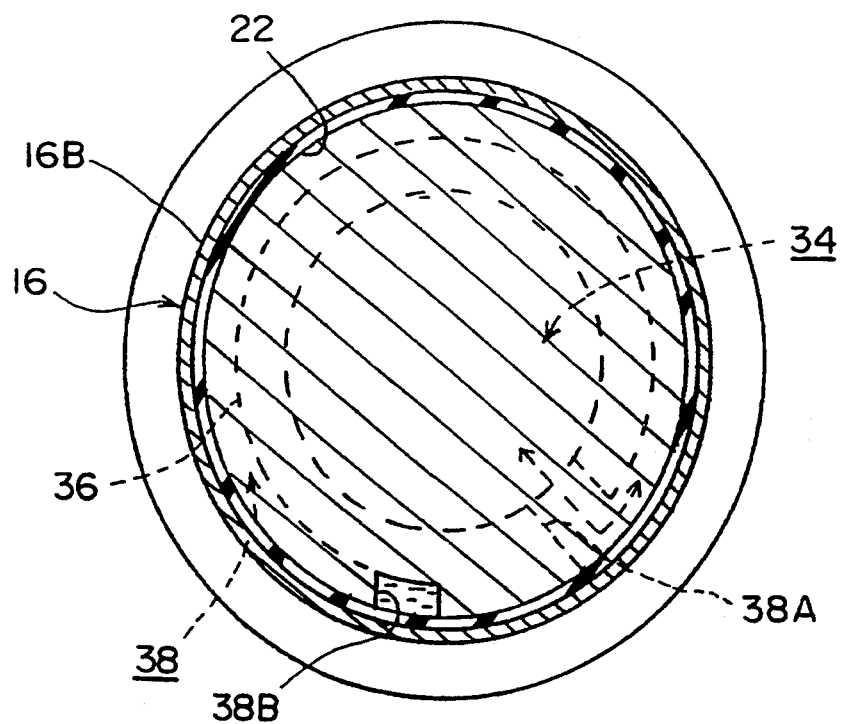
FIG. 2 is a cross-sectional view taken along line 2—2 of FIG. 1 and illustrates the a vibration isolator in accordance with the first embodiment of the present invention.

As shown in FIG. 1, a narrow groove 36 having a rectangular cross section is formed circumferentially in the peripheral portion of the partition member 30 on the lower peripheral portion 30A side thereof. FIG. 2 shows a cross section of the vibration isolator taken along line 2—2 of FIG. 1. As shown in FIG. 2, the narrow groove 36 in terms of its longitudinal direction has a substantially C-shaped configuration, and a first passageway 38 is defined by the groove 36 and the extended portion of the elastomer member 22. A central portion of the bottom of the partition member 30 is recessed toward the support base 24, and an opening 38A is formed in a side wall of the recessed portion to allow the first passageway 38 and the auxiliary liquid chamber 34 to communicate with each other. A vertical groove 38B is formed in an outer periphery of the partition member 30 to allow the passageway 38 and the main liquid chamber 32 to communicate with each other. Accordingly, one longitudinal end of the first passageway 38 communicates with the auxiliary liquid chamber 34 via the opening 38A, while another end thereof communicates with the main liquid chamber 32 via the vertical groove 38B. Namely, the main liquid chamber 32 and the auxiliary liquid chamber 34 constantly communicate with each other by means of the first passageway 38.

Figure 3:
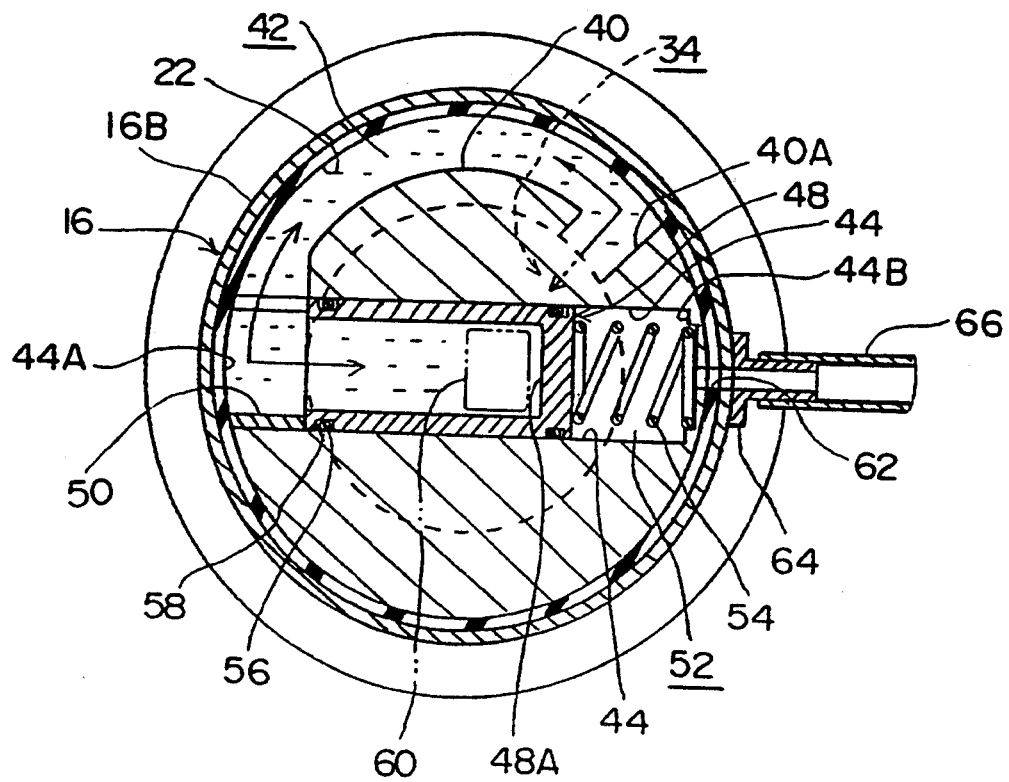
FIG. 3 is a cross-sectional view taken along line 3—3 of FIG. 1 and illustrates the a vibration isolator in accordance with the first embodiment of the present invention.

FIG. 3 shows a cross section of the vibration isolator taken along line 3—3 of FIG. 1. As shown in FIG. 3, an inner chamber 44 is formed in the partition member 30 in such a manner as to extend in the radial direction of the partition member 30. A bottom 44B (right-hand side of the inner chamber 44 as shown in FIG. 3) of the inner chamber 44 is located in the vicinity of the outer periphery of the partition member 30 away from an opening 44A of the inner chamber 44.

A wide groove 40 having a rectangular cross section is formed circumferentially in the outer periphery of the partition member 30 on the main liquid chamber 32 side, the longitudinal direction of this wide groove 40 being shorter than that of the aforementioned narrow groove 36. A second passageway 42 is defined by the wide groove 40 and the extended portion of the elastomer member 22. Formed at one of this second passageway 42 is an opening 40A which communicates with the auxiliary liquid chamber 34. The other end of the passageway 42 is connected to the opening 44A of the inner chamber 44.

As shown in FIG. 1, an opening 46 for allowing the inner chamber 44 and the main liquid chamber 32 to communicate with each other is formed in the partition member 30. A piston 48 is inserted in the interior of the inner chamber 44 in such a manner as to be movable in the axial direction of the inner chamber. The piston 48 has a hollow cylindrical shape in which one end thereof on the opening 44A side of the inner chamber 44 is an open end, while the other end, i.e., the end on the bottom side of the inner chamber 44 is closed by a closure wall 48A.

In addition, a stopper 50 is affixed in the inner chamber 44 on the opening side thereof, so as to limit an amount of movement of the piston 48. A space between the closure wall 48A of the piston 48 and the bottom 44B of the inner chamber 44 is formed as an air chamber 52. A compression coil spring 54 is disposed in the air chamber 52 for urging the piston 48 away from the bottom 44B of the inner chamber 44. When the pressure within the air chamber 52 is the same as the atmospheric pressure, the piston 48 is pressed toward the stopper 50 by the urging force of the compression coil spring 54.

An annular groove 56 is formed around an outer periphery of the piston 48 at each of the longitudinally opposite ends of the piston 48. An O-ring 58 is disposed in each annular groove 56, and is adapted to seal the gap between the piston 48 and the inner chamber 44 so as to prevent the liquid from leaking into the air chamber 52.

Figure 4:
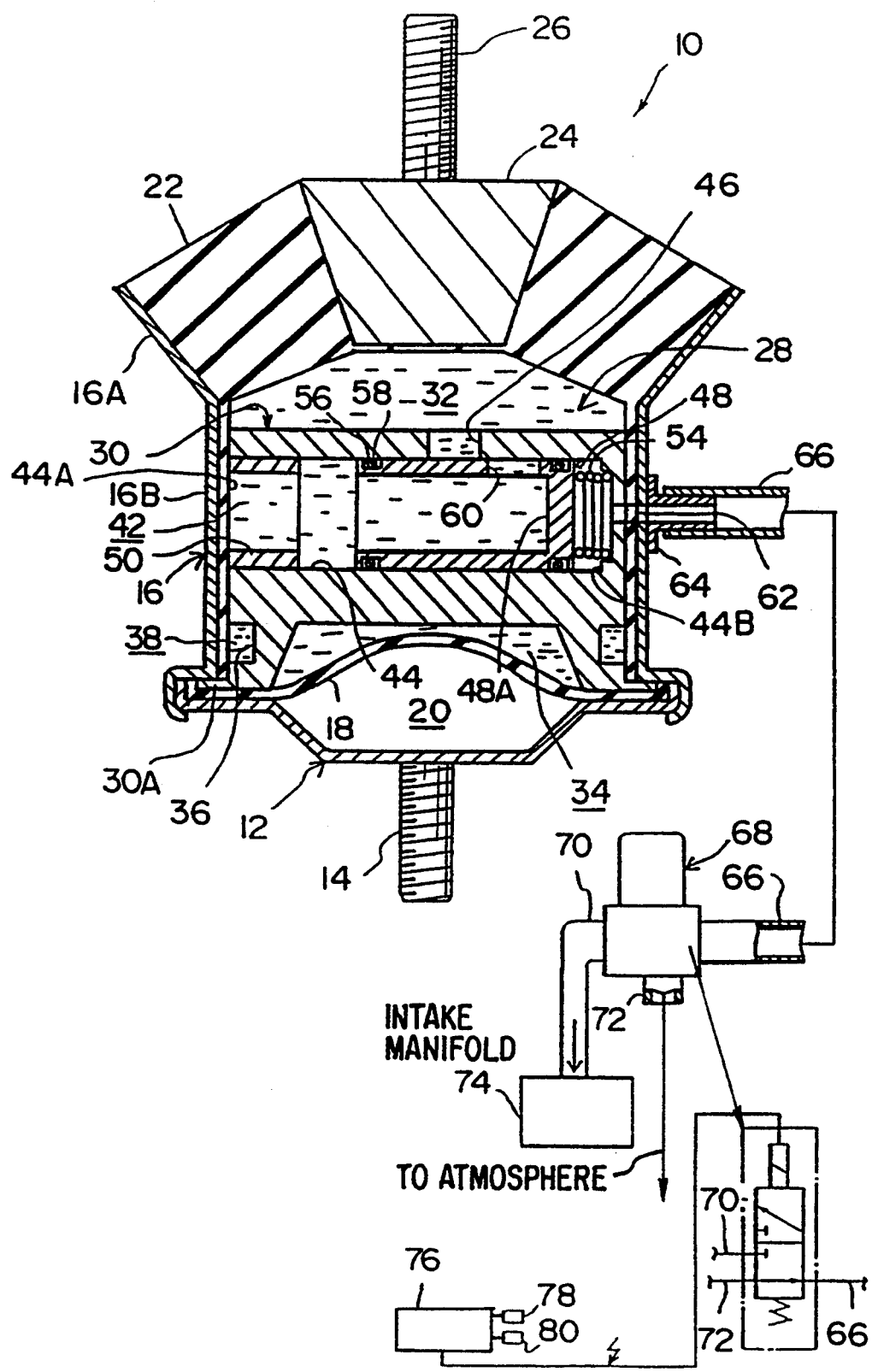
FIG. 4 is a cross-sectional view similar to that of FIG. 1 and illustrates a state in which a rectangular hole in a piston and an opening in a partition member do not communicate with each other in accordance with the first embodiment of the present invention.

A through hole 60 for allowing the interior and exterior of the piston 48 to communicate with each other is provided in the piston 48 on the main liquid chamber 32 side. The position of this through hole 60 is set as follows: The through hole 60 communicates with the opening 46 in the partition member 30 when the piston 48 is brought into contact with the stopper 50. However, the through hole 60 does not communicate with the opening 46 in the partition member 30 when the piston 48 is moved toward the bottom 44B of the inner chamber 44 and the compression coil spring 54 is fully compressed, as shown in FIG. 4.

An air opening 62 is formed in such a manner as to penetrate the partition chamber 30 (the bottom 44B of the inner chamber 44), the elastomer member 22, and the outer cylinder 16 so as to allow the interior of the inner chamber 44 and the outside of the outer cylinder 16 to communicate with each other. A coupling pipe 64 communicating with the air hole 62 is secured to the outer peripheral surface of the outer cylinder 16. This coupling pipe 64 is connected to a three-port two-position changeover valve 68 via a connecting pipe 66.

In addition to the connecting pipe 66, one end of a pipe 70 and one end of an atmosphere-communicating pipe 72 are connected to the three-port two-position changeover valve 68. The other end of the pipe 70 is connected to an intake manifold 74 of an engine, which serves as a variable-pressure supplying means. The other end of the atmosphere-communicating pipe 72 communicates with the atmosphere. The intake manifold 74 is adapted to produce an intake negative pressure.

The three-port two-position valve 68 is connected to a control means 76, and its changeover is effected by this control means 76. If the control means 76 changes over the three-port two-position valve 68 to allow the connecting pipe 66 side and the atmosphere-communicating pipe 72 side to communicate with each other, the pressure within the air chamber 52 becomes the same as the atmospheric pressure. Meanwhile, if the control means 76 changes over the three-port two-position valve 68 to allow the connecting pipe 66 side and the intake manifold 74 side to communicate with each other, the air within the air chamber 52 is sucked toward the intake manifold 74 side, so that the interior of the air chamber 52 is set under negative pressure.

The control means 76 is driven by a vehicle power source, and receives detected signals from at least a vehicle-speed sensor 78 and an engine-speed detecting sensor 80. Through these signals, the control means 76 is capable of determining whether the vehicle is in an idling state or in a shaking state.

The operation of this embodiment will be described hereafter.

The vibration isolator 10 of this embodiment mounted in a vehicle as the bottom plate 12 is secured to the chassis (not shown) via the mounting bolt 14. The engine is mounted on the support base 24 is secured thereto by means of the mounting bolt 26.

If the control means 76 determines that the vehicle is undergoing shaking vibrations, the control means 76 changes over the three-port two-position valve 68 so as to allow the connecting pipe 66 side and the intake manifold 74 side to communicate with each other. The interior of the air chamber 52 is set under negative pressure as the air inside the air chamber 52 is sucked toward the intake manifold 74 side, so that the piston 48 compresses the compression coil spring 54 and moves toward the bottom 44B of the inner chamber 44, thereby causing the piston 48 to close the opening 46 in the partition member 30 (see FIG. 4). As a result, the main liquid chamber 32 and the auxiliary liquid chamber 34 are made to communicate with each other by means of the first passageway 38 alone, and the liquid passes between the main liquid chamber 32 and the auxiliary liquid chamber 34 through the first passageway 38. As the liquid is subjected to passage resistance or liquid-column resonance in the first passageway 38, the shaking vibrations are absorbed.

During the idling vibrations, the first passageway 38 becomes clogged. If the control means 76 determines that the vehicle is undergoing idling vibrations, the control means 76 changes over the three-port two-position valve 68 to allow the connecting pipe 66 side and the atmosphere-communicating pipe 72 side to communicate with each other. Air flows into the air chamber 52 from the atmosphere, so that the pressure within the air chamber becomes the same as the atmospheric pressure. Consequently, as shown in FIG. 1, the piston 48 is pressed by the compression coil spring 54 and is brought into contact with the stopper 50, thereby allowing the through hole 60 in the piston 48 and the opening 46 in the partition member 30 to communicate with each other.

As a result, the liquid passes between the main liquid chamber 32 and the auxiliary liquid cheer 34 through the opening 46, the through hole 60, the interior of the piston 48, and the second passageway 42, and undergoes resonance. Hence, the spring constant of the vibration isolator 10 is reduced, and the idling vibrations are thereby absorbed.

In this vibration isolator 10, the intake negative pressure occurring in the intake manifold 74 of the engine is used as the driving source for opening and closing the passageway. Consequently, it is unnecessary to separately provide the so-called actuator such as a motor or a cylinder means used as the driving source for opening and closing the passageway in the conventional vibration isolator. Accordingly, it is possible to make the body portion of the vibration isolator 10 compact, and the vibration isolator 10 is subjected to less restriction in terms of the space of installation thereof. Furthermore, since the passageway can be opened or closed simply by changing over the three-port two-position valve 68, electrical control can be made simple, and the circuit configuration of the control means 68 can be made simpler than in the conventional vibration isolator.

In this embodiment, the positions of the through hole 60 in the piston 48 and the opening 46 in the partition member 30 are set such that the through hole 60 and the opening 46 in the partition member 30 are made to communicate with each other when the piston 48 is brought into contact with the stopper 50, while the through hole 60 and the opening 46 in the partition member 30 are made not to communicate with each other when the piston 48 is moved toward the bottom 44B of the inner chamber 44 and the compression coil spring 54 is fully compressed, as described above. However, the present invention is not limited to the same. For instance, the positional relationship between the through hole 60 in the piston 48 and the opening 46 in the partition member 30 may be changed in such a way that the opening 46 in the partition member 30 and the through hole 60 in the piston 48 are made not to communicate with each other when the piston 48 is brought into contact with the stopper 50, while the opening 46 in the partition member 30 and the through hole 60 in the piston 48 are made to communicate with each other when the piston 48 is moved toward the bottom 44B of the inner chamber 44 and the compression coil spring 54 is fully compressed.

In this case, it suffices if the following operation is effected: During the shaking vibrations, the three-port two-position valve 68 is changed over to allow the connecting pipe 66 side and the atmosphere-communicating pipe 72 side to communicate with each other. This in turn causes the piston 48 to move toward the bottom 44B of the inner chamber 44, thereby closing the opening 46 in the partition member 30. During the idling vibrations, the three-port two-position valve 68 is changed over to allow the connecting pipe 66 side and the intake manifold 74 side to communicate with each other, thereby causing the through hole 60 in the piston 48 and the opening 46 in the partition member 30 to communicate with each other.

Second Embodiment

Figure 5:
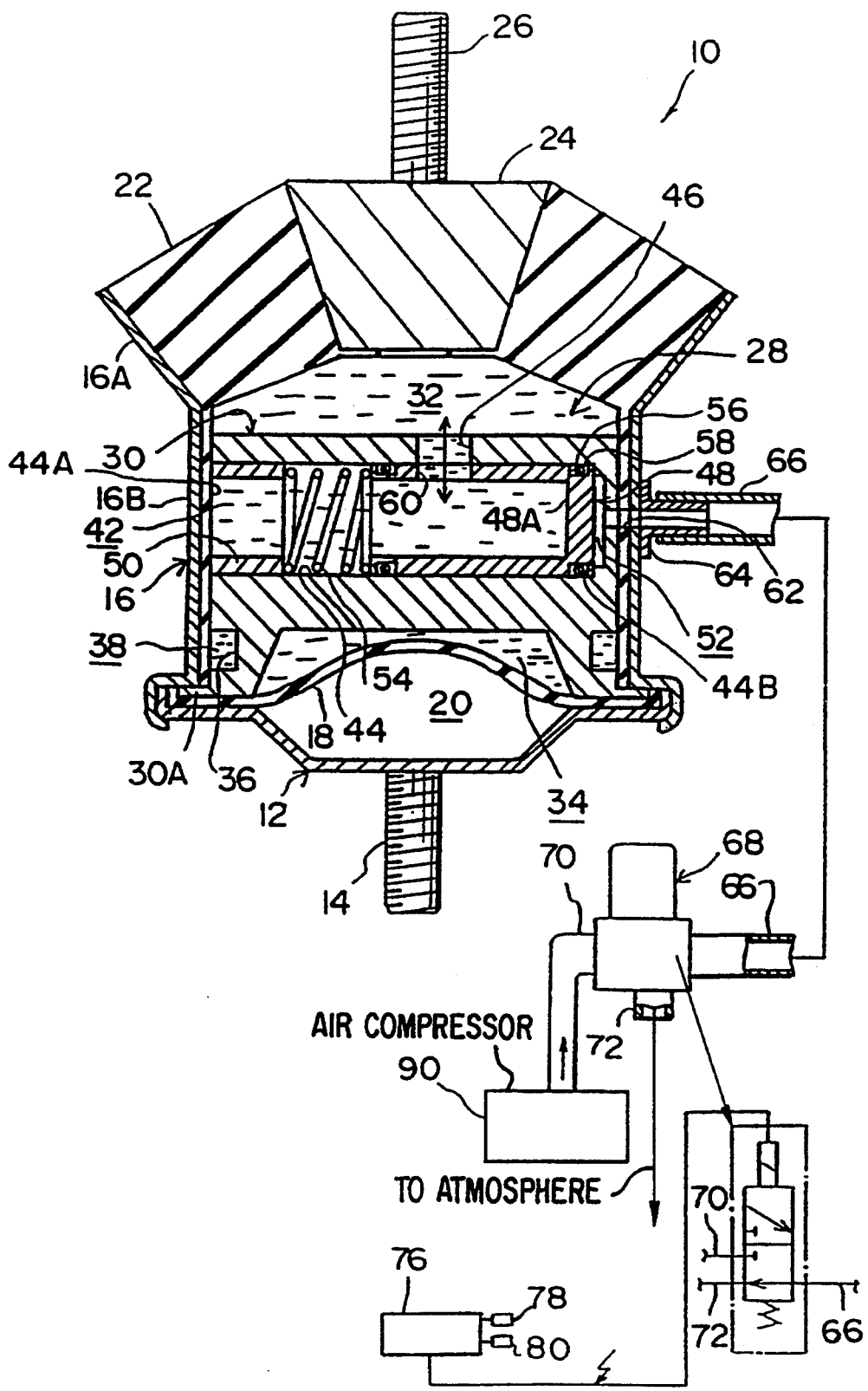
FIG. 5 is a cross-sectional view of a vibration isolator in accordance with a second embodiment of the present invention as taken along an axis thereof.

Referring now to FIG. 5, a description will be given of the vibration isolator 10 in accordance with a second embodiment of the present invention. It should be noted that the same components and portions as those of the first embodiment will be denoted by the same reference numerals, and a description thereof will be omitted.

As shown in FIG. 5, in this embodiment, the compression coil spring 54 is interposed between the piston 48 and the stopper 50, and the compression coil spring 54 urges the piston 48 toward the bottom 44B of the inner chamber 44. When the air chamber 52 communicates with the atmosphere, the piston 48 is pressed against the bottom 44B of the inner chamber 44 by the urging force of the compression coil spring 54. In this state, the through hole 60 in the piston 48 and the opening 46 in the partition member 30 communicate with each other. Meanwhile, when the pressure within the air chamber 52 becomes higher than the atmospheric pressure, and the piston 48 is moved toward the opening 44A in the inner chamber 44 and the compression coil spring 54 is fully compressed, the through hole 60 in the piston 48 and the opening 46 in the partition member 30 do not communicate with each other.

Instead of the intake manifold 74 in the first embodiment, an air compressor 90 is connected to the three-port two-position valve 68 as the variable-pressure supplying means. When the control means 68 changes over the three-port two-position valve 68 to allow the connecting pipe 66 side and the air compressor 90 side to communicate with each other, the compressed air is imparted to the interior of the air chamber 52, so that the piston 48 presses the compression coil spring 54. Meanwhile, when the three-port two-position valve 68 is changed over, and the connecting pipe 66 side and the atmosphere-communicating pipe 72 side are thereby made to communicate with each other, the piston 48 is pressed against the bottom 44B of the inner chamber 44 by the urging force of the compression coil spring 54.

In this embodiment, during the shaking vibrations, the control means 68 changes over the three-port two-position valve 68 to allow the connecting pipe 66 side and the air compressor 90 side. As a result, the pressure within the air chamber 52 becomes higher than the atmospheric pressure, so that the piston 48 compresses the compression coil spring 54. In this state, since the through hole 60 in the piston 48 and the opening 46 in the partition member 30 do not communicate with each other. Hence, the main liquid chamber 32 and the auxiliary liquid chamber 34 are made to communicate with each other through the first passageway 38, and the liquid passes between the main liquid chamber 32 and the auxiliary liquid chamber 34 through the first passageway 38. As the liquid is subjected to passage resistance or liquid-column resonance in the passageway 38, the shaking vibrations are absorbed.

During the idling vibrations, the first passageway 38 becomes clogged. The control means 68 changes over the three-port two-position valve 68 to allow the connecting pipe 66 side and the atmosphere-communicating pipe 72 side to communicate with each other. The piston 48 is moved toward the bottom 44B of the inner chamber 44 by the urging force of the compression coil spring 54, the air in the air chamber 52 is released, and the piston 48 is pressed against the bottom 44B of the inner chamber 44. In this state, the through hole in the piston 48 and the opening 46 in the partition member 30 are made to communicate with each other.

For this reason, the liquid passes between the main liquid chamber 32 and the auxiliary liquid chamber 34 through the opening 46, the through hole 60, the interior of the piston 48, and the second passageway 42, and undergoes resonance. Hence, the spring constant of the vibration isolator 10 is reduced, and the idling vibrations are absorbed.

As a modification of this embodiment, the positional relationship between the through hole 60 in the piston 48 and the opening 46 in the partition member 30 may be changed in such a way that the opening 46 in the partition member 30 and the through hole 60 in the piston 48 are made not to communicate with each other when the piston 48 is brought into contact with the bottom 44B of the inner chamber 44, while the opening 46 in the partition member 30 and the through hole 60 in the piston 48 are made to communicate with each other when the piston 48 is moved toward the opening 44A in the inner chamber 44 and the compression coil spring 54 is fully compressed. In this case, during the shaking vibrations, it suffices if the following operation is effected: The three-port two-position valve 68 is changed over to allow the connecting pipe 66 side and the atmosphere-communicating pipe 72 side to communicate with each other so as to move the piston toward the opening 44A of the inner chamber 44, thereby preventing the through hole 60 in the piston 48 and the opening 46 in the partition member 30 from communicating with each other. During the idling vibrations, the three-port two-position valve 68 is changed over to allow the connecting pipe 66 side and the air compressor 90 side to communicate with each other, thereby causing the through hole 60 in the piston 48 and the opening 46 in the passageway 30 to communicate with each other.

In the vibration isolator 10 of this embodiment as well, since the air compressor is used as the driving source for opening and closing the passageway, it is possible to obtain the advantages similar to those of the first embodiment.

Third Embodiment

Figure 8A:
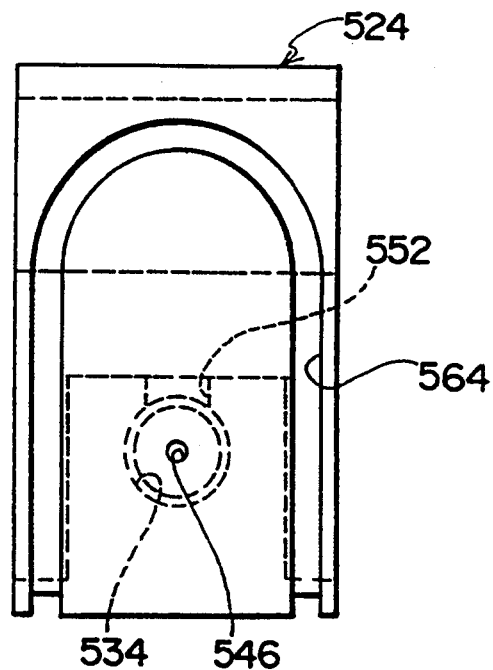
FIG. 8A is a side elevational view taken in the direction of arrow L of FIG. 6 and shows an intermediate block of the vibration isolator in accordance with the third embodiment of the present invention.
Figure 8B:
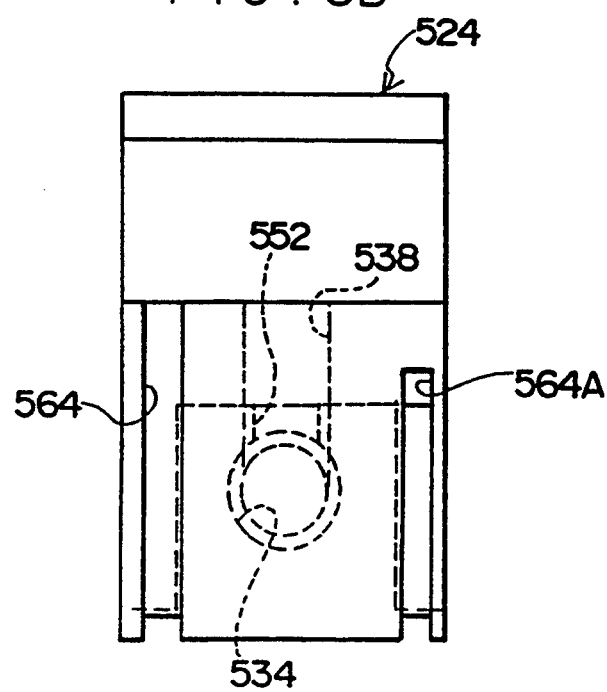
FIG. 8B is a side elevational view taken in the direction of arrow R of FIG. 6 and shows the intermediate block of the vibration isolator in accordance with the third embodiment of the present invention.

Referring now to FIGS. 6 and 8B, a description will be given of the vibration isolator 10 in accordance with a third embodiment of the present invention. It should be noted that the same components and portions as those of the first embodiment will be denoted by the same reference numerals, and a description thereof will be omitted.

FIG. 6 shows an exploded perspective view of the cylindrical vibration isolator 10 of this embodiment. The vibration isolator 10 is provided with a mounting frame 512 used for mounting on the chassis (not shown). An outer cylinder 516 serving as a second mounting member is inserted in this mounting frame 512. A diaphragm 520 is vulcanized to the inner side of this outer cylinder 516 in such a manner as to be spaced apart from the inner peripheral surface of the outer cylinder 516.

Figure 7:
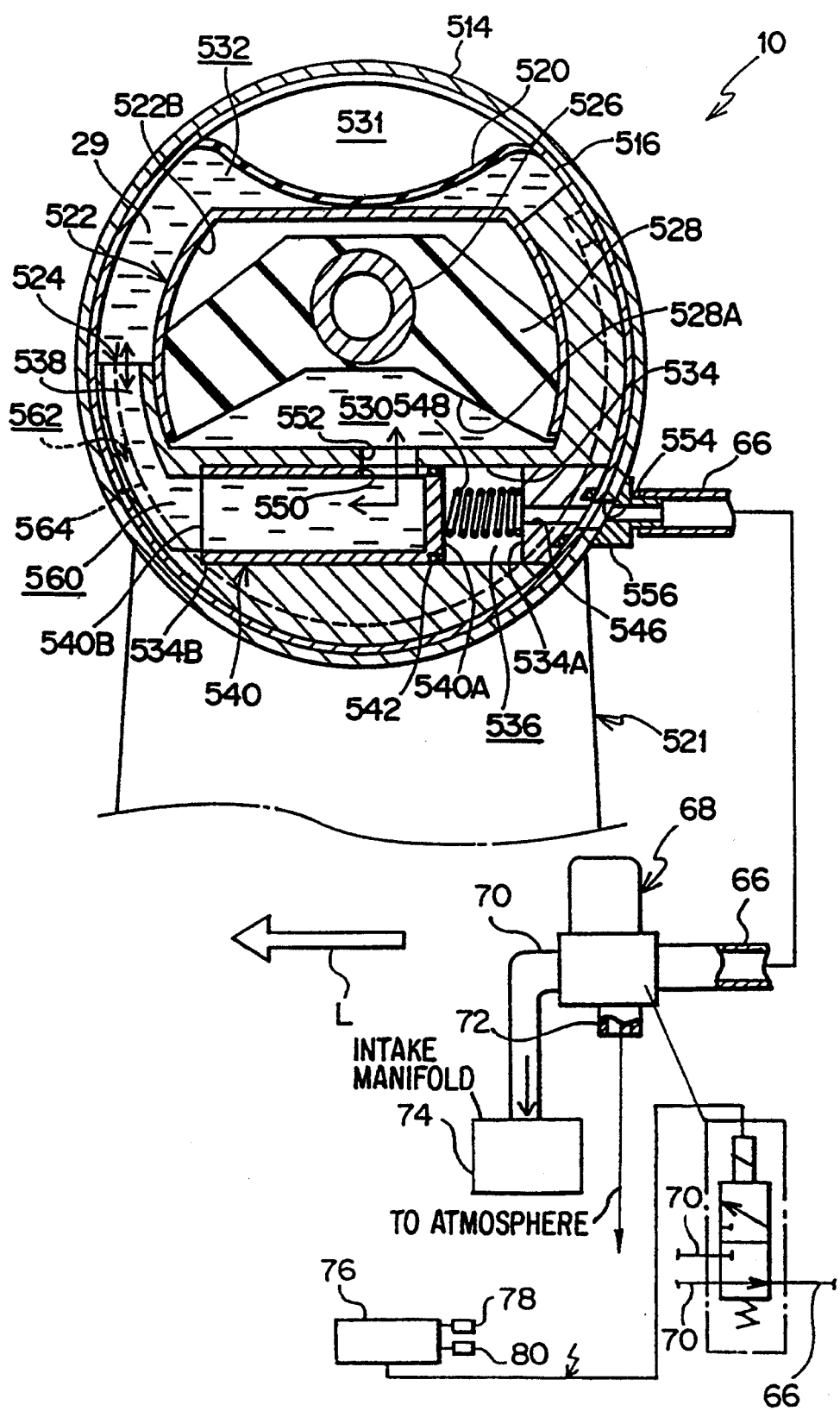
FIG. 7 is a view of a cross section, orthogonal to the axis, of the vibration isolator in accordance with the third embodiment of the present invention.

FIG. 7 shows a cross section, orthogonal to the axis, of the assembly of the cylindrical vibration isolator of this embodiment. The diaphragm 520 is formed in such a manner as to swell toward the inner side of the outer cylinder 516, and an air chamber 531 is formed between the inner periphery of the outer cylinder 516 and the diaphragm 520.

As shown in FIG. 6, an intermediate block 522 and an intermediate block 524 serving as partition members are formed in the outer cylinder 516. A flange 522A is formed at each axially opposite portion of the intermediate block 522, and an outer peripheral surface thereof is in close contact with the inner periphery of the outer cylinder 516. It should be noted that an unillustrated O-ring is provided on an outer periphery of the flange 522A to enhance the sealing performance. The intermediate block 524 is inserted between the flanges 522A of the intermediate block 522 on the lower side thereof.

As shown in FIG. 7, the intermediate block 524 has a substantially semicircular shape as viewed in the axial direction of the outer cylinder 516. When the block 524 is built into the outer cylinder 516, the outer peripheral surface of the block 524 is held in close contact with the inner periphery of the outer cylinder 516. On the other hand, the intermediate block 522 is formed by means of a plate 522B having an arcuate cross section and connecting the flanges 522A together. An inner cylinder 526 serving as the first mounting member is inserted in the outer cylinder 516 such that the axis of the inner cylinder 526 and the axis of the outer cylinder 516 are parallel with each other. Main-body rubber 528 serving as the elastomer member is provided in such a manner as to extend between opposing inner surfaces of the arcuate plate 522B with the inner cylinder 526 inserted in the main-body rubber 528. As a result, the inner cylinder 526 is supported resiliently by the main-body rubber 528, and is movable relative to the outer cylinder 516.

A notched portion 528A which forms a main liquid chamber 530 between the same and the intermediate block 524 is formed in the main-body rubber 528, as shown in FIG. 7. Between the flanges 522A of the intermediate block 522, an auxiliary liquid chamber 532 is defined by the intermediate block 522, the outer cylinder 516, and the diaphragm 520.

FIGS. 8A and 8B are side elevational views of the intermediate block 522 taken in the direction of arrows R and L, respectively, of FIG. 6. As shown in FIGS. 8A and 8B, a substantially U-shaped groove 564 is formed in an outer periphery of the intermediate block 524. One end of this groove 564 communicates with the auxiliary liquid chamber 532, and the other end thereof communicates with the main liquid chamber 530 via an opening 564A. When the intermediate block 524 is accommodated in the outer cylinder 516, a first passageway 562 (shown in FIG. 7) is formed by the groove 564 and the inner periphery of the outer cylinder 516.

A cylindrical inner chamber 534 is formed in the intermediate block 524 in a direction perpendicular to the inner cylinder 526. One longitudinal end of this inner chamber 534 communicates with the auxiliary liquid chamber 532 via a wide, rectangular opening 538 formed circumferentially in the outer periphery of the intermediate block 524. A hollow piston 540 having one end closed by a closure wall 540A is provided in the inner chamber 534 with its opening 540B facing the rectangular opening 538. This piston 540 is movable in the inner chamber 534, and a sealing O-ring 542 is provided on the outer periphery thereof on the closure wall 540A side.

The other longitudinal end of the inner chamber 534 communicates with the outside of the intermediate block 524 via a small-diameter through hole 546. A space between a bottom 534A of the inner chamber 534 at the other longitudinal end thereof and the closure wall 540A of the piston 540 is formed as an air chamber 536. A compression coil spring 548 urging the piston 540 toward the rectangular opening 538 is provided in the interior of the air chamber 536. When the pressure within the air chamber 536 is the same as the atmospheric pressure, the piston 540 is pressed against a stepped portion 534B of the inner chamber 534 on one side thereof (the side indicated by the arrow L) by the urging force of the compression coil spring 548 (see FIG. 7).

A through hole 550 is formed in the peripheral wall of the piston 540 on the inner cylinder 526 side thereof. When one end of the piston 540 is in contact with the stepped portion 534B, the interior of the piston 540 and the main liquid chamber 530 are made to communicate with each other through the opening 552 which makes the inner chamber 534 and the main liquid chamber 530 to communicate with each other. Meanwhile, when the piston 540 moves toward the air chamber 536 by a predetermined amount, an opening 552 is closed by the outer peripheral surface of the piston 540. Here, a second passageway 560 is formed by the rectangular hole 538 and the interior of the piston 540. The length of this second passageway 560 is made shorter than that of the first passageway 562, and a cross-sectional area thereof is made larger.

A liquid 29 such as ethylene glycol is filled in the main liquid chamber 530, the auxiliary liquid chamber 532, the first passageway 562, and the second passageway 560.

A through hole 554 is formed in the outer cylinder 516 and an annular portion 514 in correspondence with the through hole 546 in the intermediate block 524. A pipe-like coupling fitting 556 which is made to communicate with the through hole 554 is secured to the outer peripheral surface of the annular portion 514. One end of the connecting pipe 66 is connected to this coupling fitting 556, and the other end of the connecting pipe 66 is connected to the three-port two-position valve 56.

In this embodiment, when the vibrations are the shaking vibrations (15 Hz or less), the three-port two-position valve 68 is changed over to set the pressure within the air chamber 536 under negative pressure. When the pressure within the air chamber 536 is set under the negative pressure, the piston 540 presses the compression coil spring 548 and moves toward the air chamber 536, thereby closing the opening 552 in the intermediate block 524. Accordingly, the liquid 29 passes only through the first passageway 562 between the main liquid chamber 530 and the auxiliary liquid chamber 532. Hence, the shaking vibrations are absorbed by resistance and liquid-column resonance occurring as the liquid 29 passes through the first passageway 562.

On the other hand, when the vibrations are idling vibrations, the three-port two-position valve 68 is changed over to set the interior of the air chamber 536 under the same pressure as the atmospheric pressure. As a result, the piston 540 is subjected to the urging force of the compression coil spring 548 and thereby moves toward the rectangular opening 538, and the interior of the piston 540 is made to communicate with the main liquid chamber 530 through the opening 552. Accordingly, even if the first passageway 562 is clogged, the liquid 29 passes through the second passageway 560 between the main liquid chamber 530 and the auxiliary liquid chamber 532. Thus, as the liquid 29 undergoes liquid-column resonance in the second liquid chamber 560, the idling vibrations are absorbed.

With the vibration isolator 10 of this embodiment as well, it is possible to obtain advantages similar to those of the first and second embodiments.

Although in the foregoing embodiments a description has been given of a case where the vibration isolator 10 is used as an engine mount, the present invention is not limited to the same. For instance, the vibration isolator 10 may of course be used as other similar mount such as a body mount, a carburetor mount, or the like.

Although in the foregoing embodiments, the piston 48 is urged in one direction by the compression coil spring 54, the present invention is not limited to the same. For instance, the compression coil spring 54 may be removed if the hydraulic pressure acts in such a manner as to constantly move the piston 48 in one direction, and if the piston 48 is moved and pressed in one direction in the inner chamber 44 by the hydraulic pressure when the air in the air chamber 52 is released to the atmosphere.

As described above, since the vibration isolator in accordance with the present invention is constructed as described above, it is possible to obtain an outstanding advantage in that the overall structure including the controller is simplified.

The present invention can be implemented in various other forms without departing from the spirit and essential characteristics of the present invention. For example, although in the illustrated preferred embodiments the inner chamber and the piston are cylindrical in shape, they can be formed in the form of a prism or the like. The position of the cylinder may be located at an arbitrary position insofar as the cylinder is disposed in the partition member.

What is claimed is:

1. A vibration isolator comprising:
   a housing filled with a fluid;
   an intermediate plate inserted in said housing partitioning an interior of said housing into two liquid chambers, said intermediate plate having therein a cylinder and at least two passageways allowing said two liquid chambers to communicate with each other, said cylinder formed at a position midway in one of said passageways, at least one of said two liquid chambers provided with an elastic wall to render a capacity of at least one of said two liquid chambers variable, said intermediate plate having a first opening for allowing said cylinder and one of said liquid chambers to communicate with each other;
   a hollow piston opening and closing one of said passageways as said piston moves in said cylinder, one of longitudinal end planes of said piston having an opening for communicating with the other of said liquid chambers and the other end plane closed, said piston having in its side surface a second opening overlapping with said first opening when said piston is at a predetermined position allowing an interior of said piston and said cylinder to communicate with each other; and variable-pressure supplying means moving said piston by a change in gas pressure applied to said piston.

2. The vibration isolator according to claim 1, wherein said variable-pressure supplying means is a three-port two-position changeover valve disposed outside said housing, one port of said three-port two-position changeover valve connected to an air chamber formed in said cylinder by a portion of a cylinder wall surface and the closed bottom plane of said piston, and remaining ports of said three-port two-position changeover valve selectively communicating with the atmosphere and negative-pressure generating means.

3. The vibration isolator according to claim 2, wherein said negative-pressure generating means is an intake manifold of an engine.

4. The vibration isolator according to claim 1, wherein said variable-pressure supplying means is a three-port two-position changeover valve disposed outside said housing, one port of said three-port two-position changeover valve connected to an air chamber formed in said cylinder by a portion of a cylinder wall surface and the closed bottom plane of said piston, and remaining ports of said three-port two-position changeover valve selectively communicating with the atmosphere and an air compressor.

5. A vibration isolator comprising:

a housing filled with a fluid;

a partition member inserted in said housing partitioning an interior of said housing into a main liquid chamber and an auxiliary liquid chamber, said partition member having therein an elongated inner chamber and at least one passageway for allowing said main liquid chamber and said auxiliary liquid chamber to communicate with each other, said inner chamber communicating with said auxiliary liquid chamber, and said partition member having a first opening for allowing said inner chamber and said main liquid chamber to communicate with each other;

a hollow piston inserted in said inner chamber, one of longitudinal end planes of said piston being open and the other end plane thereof being closed, said piston having in its side wall portion a second opening for allowing an interior of said piston and said inner chamber to communicate with each other, said second opening overlapping with said first opening when said piston is at a predetermined position, thereby allowing said main liquid chamber and said auxiliary liquid chamber to communicate with each other through said interior of said piston;

an air chamber defined by said inner chamber and said closed end plane of said piston;

variable-pressure supplying means connected to said air chamber for moving said piston to the predetermined position along a longitudinal direction of said inner chamber by adjusting an internal pressure of said air chamber;

a mounting member coupled to a vibration-generating portion;

a mounting member coupled to a vibration-receiving portion; and an elastomer member defining a portion of said main liquid chamber and supporting at least one of said mounting members.

6. The vibration isolator according to claim 5, wherein said variable-pressure supplying means is a three-port two-position changeover valve disposed outside said housing, one port of said three-port two-position changeover valve connected to said air chamber, and remaining ports of said three-port two-position changeover valve selectively communicating with the atmosphere and negative-pressure generating means.

7. The vibration isolator according to claim 6, wherein said vibration-generating portion is an automobile engine, said vibration-receiving portion is an automobile chassis, and said negative-pressure generating means is an intake manifold of said engine.

8. The vibration isolator according to claim 5, wherein said variable-pressure supplying means is a three-port two-position changeover valve disposed outside said housing, one port of said three-port two-position changeover valve is connected to said air chamber, and remaining ports of said three-port two-position changeover valve being selectively communicating with the atmosphere and an air compressor.

9. The vibration isolator according to claim 5, wherein a coil spring is disposed in said air chamber and urges said piston to allow said second opening and said first opening to overlap with each other under atmospheric pressure.

10. The vibration isolator according to claim 5, wherein one of said mounting members is a frame secured to said housing, and the other one of said mounting members penetrates said housing and is supported by said elastomer member.

11. The vibration isolator according to claim 10, wherein said partition member comprises a combination of a block having said inner chamber and a block for accommodating the elastomer member therein.

12. A vibration isolator comprising:

a housing filled with a fluid;

a partition member inserted in said housing partitioning an interior of said housing into a main liquid chamber and an auxiliary liquid chamber, said partition member having therein an elongated inner chamber and at least one passageway for allowing said main liquid chamber and said auxiliary liquid chamber to communicate with each other, said inner chamber communicating with said auxiliary liquid chamber, and said partition member having a first opening for allowing said inner chamber and said main liquid chamber to communicate with each other;

a hollow piston inserted in said inner chamber, one of longitudinal end planes of said piston being open and the other end plane thereof being closed, said piston having in its side wall portion a second opening for allowing an interior of said piston and said inner chamber to communicate with each other, said second opening overlapping with said first opening when said piston is at a predetermined position, thereby allowing said main liquid chamber and said auxiliary liquid chamber to communicate with each other through said interior of said piston; an air chamber defined by said inner chamber and said closed end plane of said piston;

variable-pressure supplying means connected to said air chamber for moving said piston to the predetermined position along a longitudinal direction of said inner chamber by adjusting an internal pressure of said air chamber;

a mounting member coupled to a vibration-generating portion;

a mounting member coupled to a vibration-receiving portion;

an elastomer member defining a portion of said main liquid chamber and supporting at least one of said mounting members;

means for determining frequencies of vibrations imparted to said vibration isolator; and control means for controlling said variable-pressure supplying means to move said piston such that said first opening and said second opening overlap with each other when the vibrations are high-frequency vibrations, and such that said first opening and said second opening do not overlap with each other when the vibrations are low-frequency vibrations.

13. The vibration isolator according to claim 12, wherein said variable-pressure supplying means is a three-port two-position changeover valve disposed outside said housing, one port of said three-port two-position changeover valve connected to said air chamber, and remaining ports of said three-port two-position changeover valve selectively communicating with the atmosphere and negative-pressure generating means.

14. The vibration isolator according to claim 13, wherein said vibration-generating portion is an automobile engine, said vibration-receiving portion is an automobile chassis, and said negative-pressure generating means is an intake manifold.

15. The vibration isolator according to claim 12, wherein said variable-pressure supplying means is a three-port two-position changeover valve disposed outside said housing, one port of said three-port two-position changeover valve is connected to said air chamber, and remaining ports of said three-port two-position changeover valve selectively communicating with the atmosphere and an air compressor.

16. The vibration isolator according to claim 12, wherein said means for determining vibration frequencies comprises a vehicle speed sensor and an engine-speed detecting sensor.

* * * * *